US008058753B2

(12) United States Patent
Achilles et al.

(10) Patent No.: US 8,058,753 B2
(45) Date of Patent: Nov. 15, 2011

(54) WIDE AREA TRANSMISSION CONTROL OF WINDFARMS

(75) Inventors: Alfredo S. Achilles, Buenos Aires (AR); Parag Vyas, Munich (DE); Robert W. Delmerico, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/262,951

(22) Filed: Oct. 31, 2008

(65) Prior Publication Data
US 2010/0109447 A1  May 6, 2010

(51) Int. Cl.
H02J 3/38 (2006.01)
H02P 9/00 (2006.01)

(52) U.S. Cl. ........................................ 307/153; 307/154

(58) Field of Classification Search ........... 307/153–154
See application file for complete search history.

(56) References Cited

U.S. PATENT DOCUMENTS

| | | | | |
|---|---|---|---|---|
| 4,400,659 A * | 8/1983 | Barron et al. | .................... | 322/32 |
| 6,420,796 B1 * | 7/2002 | Lagerwey | ........................ | 290/44 |
| 6,479,907 B1 * | 11/2002 | Eriksson et al. | ................ | 290/44 |
| 6,512,966 B2 * | 1/2003 | Lof et al. | ........................ | 700/291 |
| 6,566,764 B2 * | 5/2003 | Rebsdorf et al. | ................ | 290/44 |
| 6,762,592 B2 * | 7/2004 | Noguchi et al. | ................. | 322/28 |
| 6,856,038 B2 * | 2/2005 | Rebsdorf et al. | ................ | 290/44 |
| 6,856,039 B2 * | 2/2005 | Mikhail et al. | .................. | 290/44 |
| 6,924,565 B2 * | 8/2005 | Wilkins et al. | .................. | 290/44 |
| 7,002,260 B2 * | 2/2006 | Stahlkopf | ........................ | 290/44 |
| 7,015,595 B2 * | 3/2006 | Feddersen et al. | ............. | 290/44 |
| 7,071,579 B2 * | 7/2006 | Erdman et al. | .................. | 290/55 |
| 7,095,130 B2 * | 8/2006 | Ichinose et al. | ................. | 290/44 |
| 7,119,452 B2 | 10/2006 | Larsen | | |
| 7,166,928 B2 | 1/2007 | Larsen | | |
| 7,224,081 B2 | 5/2007 | Larsen | | |
| 7,245,037 B2 * | 7/2007 | Angquist et al. | ................ | 290/44 |
| 7,462,947 B2 * | 12/2008 | Wobben | ......................... | 290/44 |
| 7,514,907 B2 * | 4/2009 | Rajda et al. | .................... | 323/205 |
| 2003/0015876 A1 * | 1/2003 | Ichinose et al. | ................. | 290/44 |
| 2003/0227172 A1 * | 12/2003 | Erdman et al. | .................. | 290/44 |
| 2005/0042098 A1 * | 2/2005 | Wobben | ..................... | 416/132 B |
| 2005/0200133 A1 * | 9/2005 | Wobben | ......................... | 290/55 |
| 2006/0028025 A1 * | 2/2006 | Kikuchi et al. | ................. | 290/44 |
| 2007/0124025 A1 * | 5/2007 | Schram et al. | ................ | 700/287 |
| 2008/0093856 A1 * | 4/2008 | Stiesdal | .......................... | 290/44 |
| 2009/0055030 A1 * | 2/2009 | Mayor et al. | ................... | 700/287 |
| 2009/0160187 A1 * | 6/2009 | Scholte-Wassink | ............ | 290/44 |
| 2009/0218817 A1 * | 9/2009 | Cardinal et al. | ................ | 290/44 |
| 2010/0025994 A1 * | 2/2010 | Cardinal et al. | ................ | 290/44 |
| 2010/0156192 A1 * | 6/2010 | Wang et al. | ..................... | 307/82 |

FOREIGN PATENT DOCUMENTS

EP        2182207 A2 *   5/2010

* cited by examiner

*Primary Examiner* — Jared Fureman
*Assistant Examiner* — Adi Amrany
(74) *Attorney, Agent, or Firm* — Dority & Manning, P.A.

(57) ABSTRACT

A means for improving the dynamic and voltage stability of utility transmission systems is provided by the coordinated control of windfarms. Electrical measurements of the system, which may include synchronized phasors, are supplied to one or more windfarm controllers, which in turn perform a regulation function improving the damping of electromechanical oscillations or voltage performance in the utility system. The control structure is of a decentralized nature, which maintains operation in case of communication failures. The benefits are improved damping to electromechanical oscillations and better voltage performance and ultimately increased utilization of assets, reducing the install additional network assets.

30 Claims, 11 Drawing Sheets

WIDE AREA TRANSMISSION CONTROL OF WINDFARMS

BACKGROUND OF THE INVENTION

The invention relates generally to stability control of electrical windfarm systems within an electric power system and more specifically to control of dynamic and voltage stability of an electric power system by controlling electrical windfarm systems.

Typically, an electric power system includes a plurality of power generation assets, which are spread over a geographic area. The electric power system also includes systems that consume power (loads) that may also be spread over the geographic area. The electric power system also includes a grid, a network of electric power lines and associated equipment used to transmit and distribute electricity over a geographic area. The infrastructure of the grid, may include, but is not limited to devices for interconnection, control, maintenance, and improvement of the electric power system operation. Typically, the electric power system includes a centralized control system operatively connected to the power generation assets for controlling a power output of each of the power generation assets, for example, using processing logic. The network operator usually operates the centralized control system. The power output of the power generation assets controlled by the centralized control system may include, but is not limited to an amount of electrical power, and a voltage for the electrical power.

The power generation assets include individual power generating stations. The power generating station, may for example, each serve a geographic region within the grid by delivering electrical power to such regions. The power generation assets may each include any type of power source. For example, the power generation assets may include a power source that generates electrical power at least partially from coal, water, a combustible fluid such as gasoline, natural gas, diesel fuel, etc., nuclear, wind, and solar energy.

Wind energy is often used to generate electrical power at power plants, often referred to as windfarms, using, for example, the rotation of large wind turbines to drive electrical generators. Windfarms and their associated windfarm controllers can control reactive power supply, and to a more limited extent active power. Larsen, in U.S. Pat. No. 7,119,452, U.S. Pat. No. 7,166,928, and U.S. Pat. No. 7,224,081, describes a voltage control for wind generators including a farm-level controller with a reactive power command and a wind turbine generator control system. Wind turbine generator voltage control may be provided by regulating the voltage according to a reference set by a higher-than-generator-level (substation or farm level) controller. Reactive power may be regulated over a longer term (e.g. few seconds) while wind turbine generator terminal voltage is regulated over a shorter term (e.g. fraction of a second) to mitigate the effect of fast grid transients.

For economic reasons and as one of the approaches to reduce the environmental impacts of fossil fuel power generation, wind turbine generators with larger power output are being produced and windfarms with greater numbers of wind turbine generators are being brought into operation. The power output from the windfarms in the future may comprise a significantly larger part of the total power being supplied and transmitted along the transmission grid. At the same time, there is increasing concern about the transmission capacity available for new large-scale windfarms, and the stability issues limiting transmission capacity.

The maximum operating capacity of transmission systems can often be limited by voltage stability, voltage limits, and electromechanical oscillations rather than by thermal loading limits. If these constraints can be overcome, network assets can be better utilized and in some cases investment in additional assets can be avoided.

Figure 1:
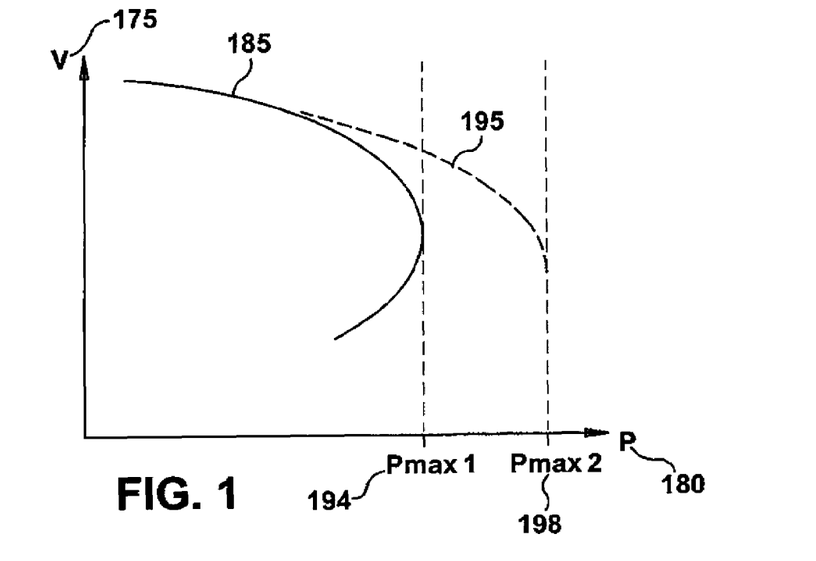
FIG. 1 illustrates a response curve showing a representative curve for a transmission system collapse due to overpower and how application of inventive controls for wind farms may extend the operation of the transmission system, preventing voltage collapse.

FIG. 1 illustrates a representative response curve for a transmission system collapse due to increased power transfer between areas and how application of inventive controls for wind farms may extend the operation of the transmission system, preventing voltage collapse. The vertical axis represents transmission system voltage power flow 175 and the horizontal axis represents power flow 180. In a stressed condition, as the power flow (P) 175 increases, the voltage 180 at a given point on the voltage vrs. power flow line (solid line) 185 starts to decrease. The power P that can be transmitted in the system must be limited below $Pmax_1$ 194 due to voltage collapse. If the power increases close to $Pmax_1$ 194, the voltage 180 "collapses" considerably, normally causing protective relaying operations and load disconnections. In practice, an operating margin (not shown) is maintained below $Pmax_1$ 194 to avoid collapse.

Electromechanical oscillation modes that can occur, can be local, where individual synchronous generators in the power generation assets oscillate against the electric power system (of the order 0.3 to 1 Hz), inter-area, where groups of generators oscillate over a long distance system oscillates (0.2 to 1.0 Hz), and complex oscillations which can be a combination of local and inter-area modes.

Electromechanical oscillations will most likely occur within traditional generators in the network. Present wind turbine generator (WTG) technologies do not participate on the oscillation (although they can affect their damping). Further, potential new WTG concepts (hydraulic torque converters with synchronous machines directly connected) could actively participate in the electromechanical oscillation modes.

Damping of electromechanical oscillations can be improved with control devices in excitation of synchronous generators or power system stabilizer (PSS) controls. PSS have been applied in conventional power generation.

Flexible AC transmission systems (FACTS) devices are solutions to many transmission system problems. These devices often consist of the addition of series or shunt capacitors in combination with other passive devices or active switches may be added to the transmission grid. Typical FACTs devices are static VAR compensator (SVC) and Static synchronous compensator (STATCOM). The SVC and STATCOM are electrical devices for providing fast-acting reactive power compensation on high voltage electrical transmission networks. Other solutions consist of building additional lines and utilizing series capacitors in long lines. However, the FACTS approaches incur the cost for the hardware fixes.

Accordingly, there is a need to provide a structure and method for preventing voltage collapse on a transmission system, where the voltage collapse results from stressed conditions on the transmission line. Further, there is a need for improving damping of electromechanical oscillations within the electric grid.

BRIEF DESCRIPTION OF THE INVENTION

The present invention relates to a system and method for using windfarm voltage control capabilities to provide stability in a transmission system. Specifically the windfarm voltage control capabilities may to used: 1) to avoid voltage collapse on a stressed grid system, and 2) to provide damping for electromechanical oscillations in the grid to which the windfarms may be connected.

The enhancement stems from the ability of a local windfarm controller to control the output reactive power of the local wind turbines. This is possible due to power electronic converters used in the wind turbines and their ability to supply reactive power even at zero wind speeds. The windfarm may be supplied with wide-area measurements, which are incorporated into the controller. The coordination of multiple windfarms to assist in stabilizing the transmission grid is also a feature of the present invention. Improved stability and voltage control of transmission networks, in a robust way, may be provided during and post-fault events. This can ultimately increase utilization of network assets using available equipment in a windfarm.

According to a first aspect of the present invention, a wind turbine generator control system is provided. The control system is provided for at least one windfarm including at least one wind turbine generator connected through a collection bus and main transformer to a point of common connection with a power transmission network. The power transmission network includes a plurality of generator/load groups physically distributed within the transmission network and including at least one non-renewable energy source.

The wind turbine generator control system includes a windfarm controller for each of the at least one windfarms, wherein the windfarm controller controls operation of the at least one wind turbine generator within the windfarm. The control system also includes at least one measurement point on the transmission system for measurement of transmission system operating parameters and a plurality of sensors for measurement of transmission system parameters related to control of the one or more windfarms. A coordinated controller employs the measured transmission system parameters for windfarm to generating output signals enhancing stability of the transmission system. A communication means is provided for transmitting the transmission system parameters to the coordinated controller and transmitting the control signals to at least one windfarm.

According to a second aspect of the present invention, a method for maintaining stability on a power transmission network is provided. The transmission network may include multiple generator/load groups with at least one non-renewable energy source physically distributed within the transmission network and at least one windfarm with a windfarm controller. The windfarm may include at least one wind turbine generator connected through a collection bus and main transformer to a point of common connection with the power transmission network.

The method includes measuring at least one transmission system operating parameter at at least one point on the transmission network. The method also includes transmitting the at least one transmission system operating parameter from the at least one point on the transmission network to a coordinated windfarm controller. The coordinated controller determines in response to least one of the measured transmission system parameters an operating command for at least one windfarm relating to stability of the transmission system. The operating command to the windfarms for stability of the transmission system are transmitted from the coordinated controller to the at least one windfarm. The commanded output from the windfarms is provided to the transmission network at the point of common connection.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including improved dynamic and voltage stability of utility transmission systems through the coordinated control of windfarms.

Means of electrical measurements of the system (with or without synchronized phasors) are supplied to one or more windfarm controllers, which in turn perform a regulation function improving the voltage performance and/or damping of electromechanical oscillations in the utility grid. The control structure may be of a decentralized nature, which maintains operation in case of communication failures. The benefits are better voltage performance, improved damping to electromechanical oscillations and ultimately increased utilization of assets, reducing the need to install additional network assets.

The present invention utilizes the ability of a local windfarm controller to control the output reactive power of the local wind turbines. This is possible due to power electronic converters used in the wind turbines and their ability to supply reactive power even at zero wind speeds. According to an aspect of the invention, one or more windfarms in a grid may be supplied with wide-area measurements of the transmission system. The wide-area measurements are input into a coordinated controller. The coordinated controller may provide regulation for a single windfarm or multiple windfarms. The regulation performed by the coordinated controller may assist in maintaining the voltage on the grid and preventing voltage collapse, may assist in providing damping for oscillations on the grid, or provide a combination of voltage control and damping. The wide-area measurements may or may not be in the form of synchronized phasors.

The use of wide-area measurements for improving the stability of transmission systems has been proposed in the literature. Kamwa, Grondin and Hebert (Wide-Area Measurements Based Stabilizing Control of Large Power Systems Â—A Decentralized/Hierarchical Approach, IEEE Trans. Power Systems, Vol. 16, No. 1, pp. 136-152, February 2001) show in a Hydro-Quebec system improved damping of inter-area modes, enhanced voltage profiles at remote weak busses and overall better system robustness by utilizing some wide-area measurements and additional control signals in a small number of PSS controllers. Quintero and Venkatasubramanian (A Real-Time Wide-Area Control Framework for Mitigating Small-Signal Instability in Large Electric Power Systems, Proc. 38th Hawaii Intl. Conf. System Sciences Â—2005), describe a centralized controller utilizing wide-area measurements and dispersed SVCs for improved damping during and after system faults.

Wide Area Measurements (WAM) systems (also associated with the terms Wide Area Monitoring) comprise the sensors, electronic devices and communications networks to enable fast monitoring of remote locations. The communications networks operate over geographically dispersed regions with high-speed and reliablility. The information on the communicated across the system must be transmitted in "real-time", that is to say that the data is guaranteed to arrive within a fixed and pre-specified time delay. The electronic devices can typically be "Intelligent Electronic Devices" as defined in Technical Report IEC TR 61850-1, First edition 2003-04, "Communication networks and systems in substations—Part 1: Introduction and overview". Communications protocols include IEEE Standard 1344-1995 Standard For Synchrophasors For Power System, dated Mar. 30, 2001. IEEE Standard 1344-1995 addresses synchronized phasor measurement systems in substations, including synchronization of data-to-phasor conversions, data sampling, formats for timing input and phasor data output from a phasor measurement unit (PMU). It does not specify response time, hardware, accuracy software or a process for computing phasors. The standard describes communication protocols within a substation or local area network (LAN)), such as one for a windfarm or other power generating/load area. This standard does not cover the exchange of data between a substation and a remote monitoring or control centre.

Figure 2:
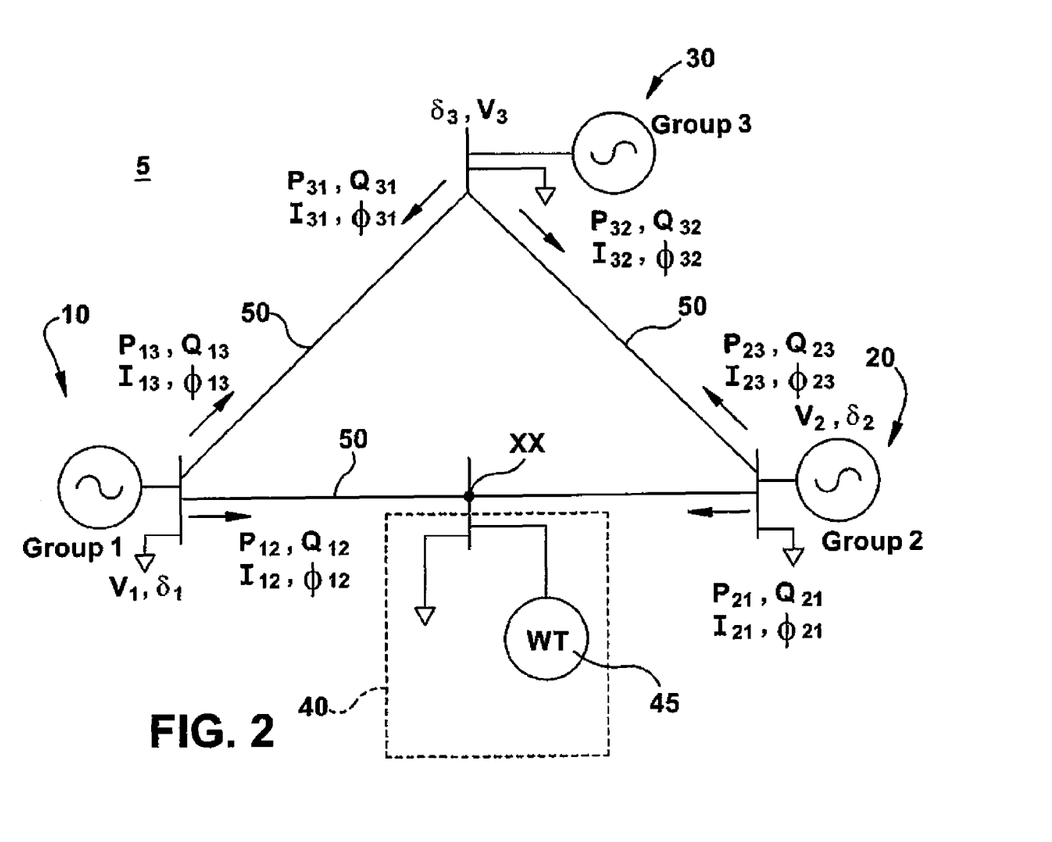
FIG. 2 illustrates a transmission system incorporating system parameter measurement locations for a plurality of non-renewable energy electric power generation sources and at least one electric generating wind farm.

FIG. 2. illustrates a schematic representation of a transmission system 5 connecting several groups of generators and loads together with one (or more) wind turbines arranged in one or more windfarms. Group 1 10, Group 2 20 and Group 3 30 generator/load groups represent and may include one or more generators supplying electrical power from one or more energy sources such as coal, steam, water, a combustible fluid such as gasoline, natural gas, diesel fuel, solar energy, nuclear power, and a gas turbine power station. The individual generator/load group may supply loads local to the group such as industrial, commercial and residential facilities. The transmission system may further be tied together with one or more windfarms 40 including one or more wind turbine generators 45 by transmission lines 50.

The transmission system includes parameters such as active power (P), reactive power (Q), current magnitude (I) and current phase angle ($\phi$) between the generator groups. These parameters include a notation in subscripts representing the relationship between the generator/load groups. The quantity $P_{32}$, for example, represents the active power flow from Group 3 to Group 2 measured at the output of Group 3, in the direction of the arrow marked on the diagram. The direction of this arrow is arbitrary and only describes the convention used here for the direction of positive flow. Any of the quantities may be negative in value. At each of the groups, the quantities $\delta_i$ and $V_i$ represent the phase angle and magnitude of voltage vector measured at the Group i.

At each of the generator/load groups, suitable points may be provided for measurements of parameters P, Q, I, $\phi$, $\delta_i$ and $V_i$. The parameters may be provided remotely to a windfarm controller to facilitate voltage stability on the transmission grid and control of electromechanical oscillations, which can occur between and among the generator/load groups. Measurement of the above parameters may be achieved at the generator/load groups, for the windfarm and at other points within the transmission grid by instruments comparable to those defined in Technical Report IEC TR 61850-1, First edition 2003-04. The data may be measured and handled as synchronized phasors. Because synchronized phasors are referenced to highly precise and accurate common time references such as a global positioning system clock and may be incorporated within a high-speed transmission system, measurements taken even over widely distributed geographic areas may be accurately compared for the purpose of controlling widely dispersed elements, such as parts of a transmission system. Data handling for synchronized phasor measurements may be performed according to IEEE Standard 13111-1995 "Standard For Synchrophasors For Power Systems", dated Mar. 30, 2001.

Figure 3:
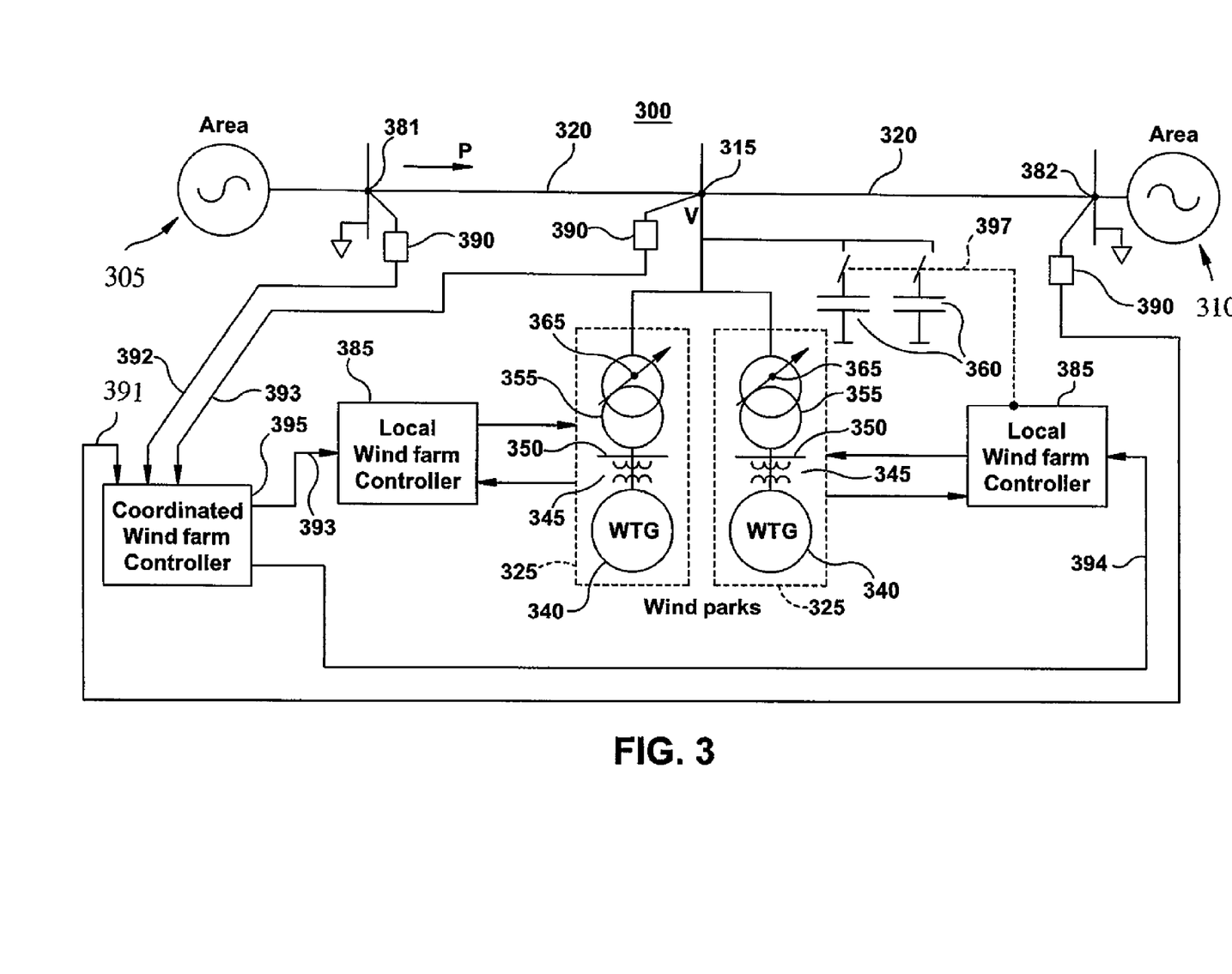
FIG. 3 illustrates a configuration of windfarms with windfarm controllers and other control devices for assisting in control of a transmission system.

FIG. 3 illustrates a configuration of windfarms with windfarm controllers and other control devices within a transmission system including generating/load areas. The transmission system 300 includes two windfarms 325 representing a plurality of windfarms of any number that may be connected to the transmission system 300 through a point of common connection 315. The transmission system 300 further includes a plurality of generating/load areas, represented by two areas, Area 1 305 and Area 2 310. A transmission line 330 is provided between Area 1 305 and Area 2 310. Transmission system parameters are denoted consistent with the nomenclature previously described with respect to FIG. 2. Each windfarm 325 may include a plurality of wind turbine generators (WTG) 340 and the associated connection transformer 345 for each individual WTG 340 connected to a collector bus 350. A main transformer T 355 connects the collector bus 350 for each windfarm to the point of common connection 315 for the transmission line 330. The windfarm 325 may further include other assets such as shunt capacitors 360 and on-load tap changers (OLTCs) 365 for main transformers 355. A local windfarm controller 385 may provide overall control for operation of the WTG 340 and other control elements within the windfarm 325. Local windfarm controllers 385 may provide for the real and reactive power control of wind turbine generators.

In this exemplary system, power (P) flows from Area 1 305 towards Area 2 310 via the transmission line 320. At one or more points 380, 381, 315 on the system, which may be predefined, the system parameters are measured by instruments 390 and supplied to a coordinated windfarm controller 395, which coordinates the response of one or more windfarms 325 and/or other assets such as the shunt capacitors 360 and on-load tap changers (OLTCs) 365 within the windfarms 325.

Signals 391, 392, 393 representing the sensed transmission system parameters may be provided to the coordinated windfarm controller 395 to assist in avoiding voltage collapse on the transmission line. Prevention of voltage collapse on the transmission line may be provided through regulation of reactive power of the windfarms via control signals. The windfarms may also include shunt capacitors 360 and other control devices, operating by control signal 397 under the direction of the local windfarm controller 385. The shunt capacitors may assist in preventing voltage collapse on the transmission line. A plurality of transmission system parameter may be provided to the coordinated windfarm controller. In a further aspect, active power may be reduced as a variable for controlling voltage collapse.

Figure 4:
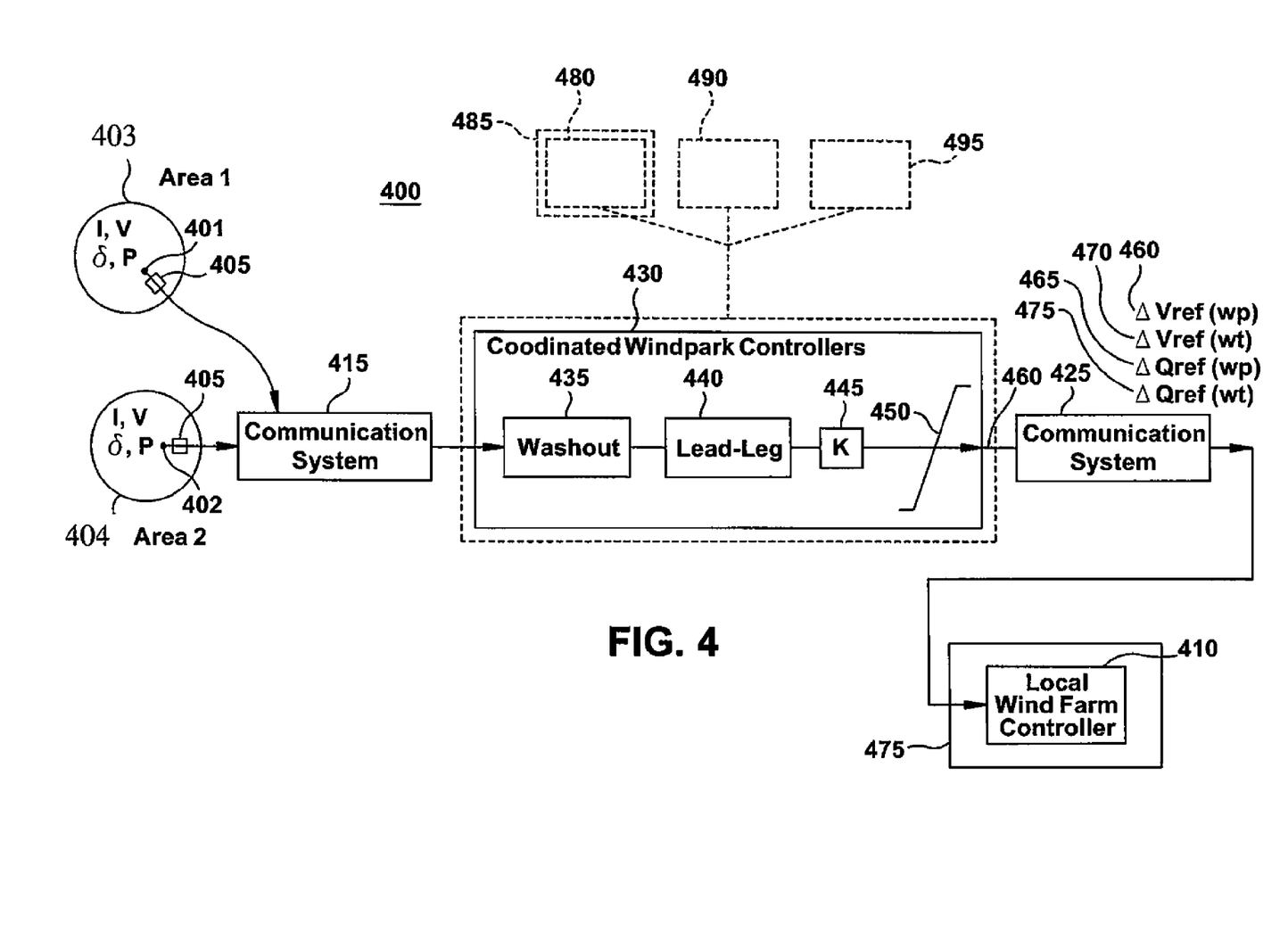
FIG. 4 illustrates an embodiment of an inventive coordinated controller for improving damping of electromechanical oscillations occurring in a transmission system like the one of FIG. 1.

FIG. 4 illustrates a wind turbine control system 400 with a controller, referred to as a "coordinated windfarm controller" that may be used to limit voltage oscillations occurring in a transmission system, such as the one illustrated in FIG. 3. Measurement of system parameters may be obtained from the system at measurements points at a plurality of locations. The measurement points may be represented by a first point 401 and a second point 402 representative of area 1 403 and area 2 404, respectively. The measurements described above may be provided as synchronized phasors. Measurement instruments 405 sense system parameters and provide the measurements to a communications network 415 for transmittal to the coordinated windfarm controller 430. An embodiment of the coordinated windfarm controller 430 includes an implementation for algorithm, may contain a washout filter element 435, a lead-lag compensator 440 and a gain 445 with output limiter 450.

The washout filter 435 is a high pass filter that rejects steady state and very low frequency inputs, while passing transient of medium to high frequency inputs. It is used so that the controller does not affect the steady state operating point of the system, but instead to allow modifications around the operating point. Additional filters such as low pass filters can be included. The lead-lag compensator 440 is a filter that is designed to advance or retard the phase of frequency components at the desired frequencies and is applied to improve damping characteristics within the feedback control circuit. The gain 445 represented by value K is the ratio of output to input signal. The saturation component 450 produces an output identical the input value unless the input is greater than some upper predefined limit or less than a lower predefined limit, in which case the output is set to the upper or lower limit respectively.

Output 460 of the coordinated windfarm controller 430 is then transmitted by the communications network 425 to the local windfarm controller 410. The output signal 430 could be at least one of a windfarm voltage reference change ($\Delta$Vref(WP)) 460, windfarm reactive power reference change ($\Delta$Qref(WP)) 465, individual wind turbine voltage reference change ($\Delta$Vref(WT)) 470, an a individual wind turbine reactive power reference change ($\Delta$Qref(WT)) 475, or in other formats useful for a windfarm control system (such as described in Larsen, in U.S. Pat. No. 7,119,452, U.S. Pat. No. 7,166,928, and U.S. Pat. No. 7,224,081). The above-described embodiment describes the control for a single windfarm 475, but such control may be extended to multiple windfarms. The coordinated windfarm controller 430 may be located physically on a computer system 480 incorporated as part of a windfarm management system 485 which may be present at the windfarm 475, physically located on a computer system of the utility system operator 490, or it maybe be implemented on an independent computer system 495.

Referring again to FIG. 1, application of the inventive stability controls for transmission line voltage exercised through control of wind farms connected to the transmission network may extend the operation of the transmission system, preventing voltage collapse. For example, the capacity of the system to transmit power before the onset of voltage collapse is extended (dashed line) 195 to Pmax2 198.

Figure 5:
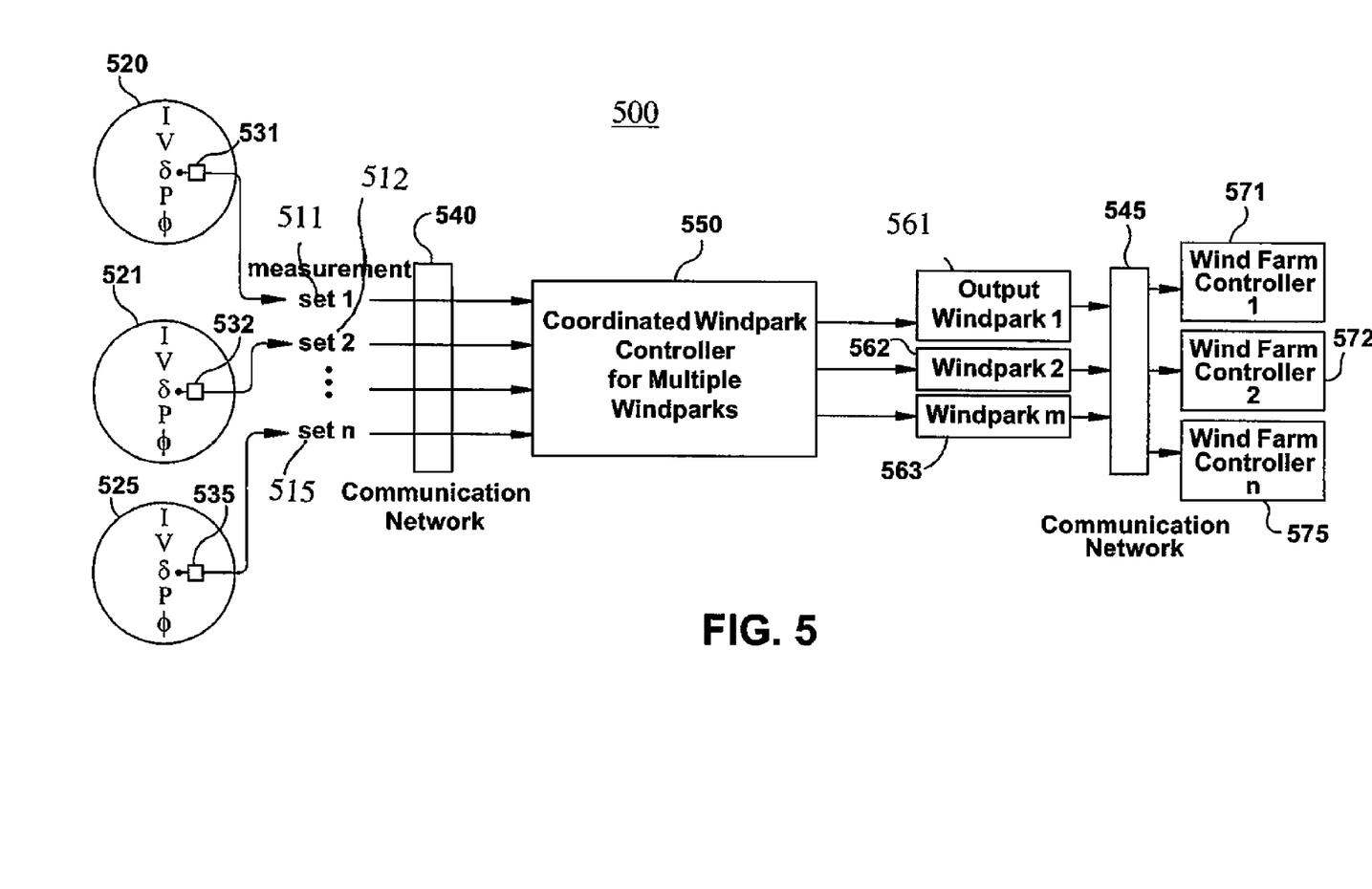
FIG. 5 illustrates an embodiment of an inventive coordinated controller providing control for wind turbines of multiple wind farms.

FIG. 5 illustrates an embodiment of an inventive coordinated windfarm controller that may be used to limit voltage oscillations occurring in a transmission system, such as the one illustrated in FIG. 1. FIG. 5 represents an extension of the case of FIG. 4 where control is extended to multiple windfarms. Not shown are the detailed elements included in the controller but essentially the functions of the controller in FIG. 4 are extended to the multiple inputs and outputs case.

The coordinated windfarm control system 500 includes a plurality of local windfarm controllers, represented as windfarm controller 1 571, windfarm controller 2 572, and windfarm controller n 575 to provide stability control a transmission grid. The coordinated windfarm control system 500 is not limited to control of any specific number of windfarms. The coordinated windfarm controller 500 receives a plurality of measurement sets (represented as measurement set 1 511, measurement set 2 512, . . . measurement set n 515). Each of the measurement sets may include transmission system parameters, which may include (P, Q, I, $\phi$, $\delta i$ and $V_i$) from a plurality of different measurement points 520, 521, . . . 525 on the transmission network. Measurement sets 511, 512, . . . , 515 are transmitted by a communication network 525 from sensors 531, 532, . . . 535 at the measure points to the coordinated windfarm controller 550. Outputs signals from the coordinated windfarm controller 550 are transmitted by the communication network 545 to the respective windfarms controller 571, 572 . . . 575.

The output of the coordinated controller provides control signals for m different windfarms so as to improve damping of electromechanical oscillations on the transmission line. The elements of the coordinated controller may include a washout filter extended to the multi-input multi-output case, a filter exhibiting properties of the lead-lag filter in FIG. 4 (multi-input multi-output), an amplification matrix, and saturation limits on the outputs. The multiple control signals to the windfarms may include at least one of a windfarm voltage reference change ($\Delta$Vref(WP)) 460, windfarm reactive power reference change ($\Delta$Qref(WP)) 465, individual wind turbine voltage reference change ($\Delta$Vref(WT)) 470, an a individual wind turbine reactive power reference change ($\Delta$Qref(WT)) 475, previously described with respect to single windfarm controller 430 of FIG. 4.

Figure 6:
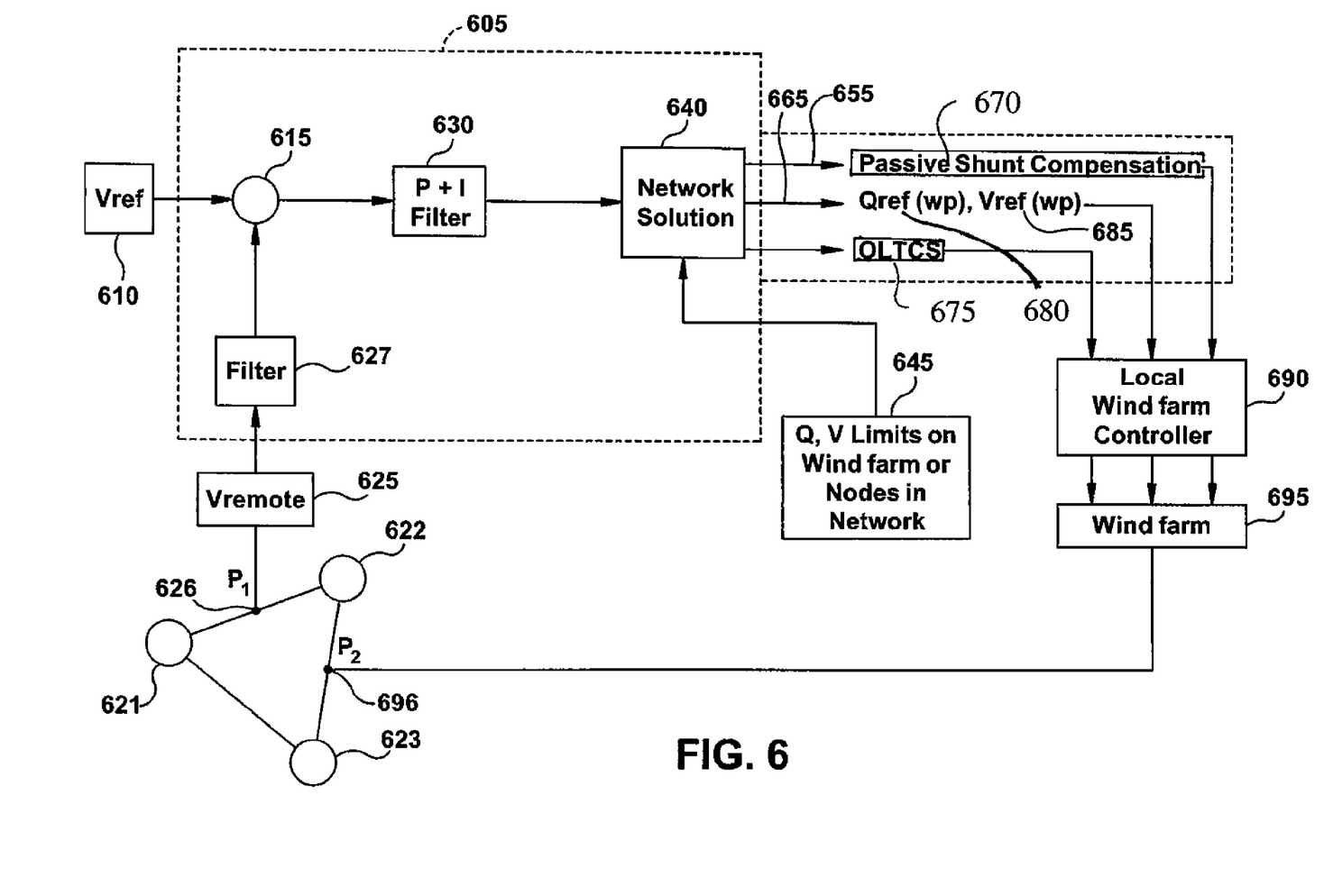
FIG. 6 illustrates an embodiment of an inventive coordinated controller providing control for wind turbines and associated reactive control devices within multiple wind farms.

FIG. 6 illustrates an embodiment of an inventive coordinated controller providing control for wind turbines and associated reactive control devices within multiple wind farms. The coordinated system controller 605 provides outputs for control of a plurality of system reactive control devices, in addition to the stabilizing control signal 665 to windfarms 695. Such reactive control devices may include passive shunt capacitors 670 and on load tap changers 675.

The inputs are a reference voltage (Vref) 610 which may be preprogrammed or set by the utility system operator and can be updated from time to time. (Vref) 610 is compared to a measurement of voltage (Vremote) 625 which is from a defined point P1 626 on the transmission system and may be remote from any point P2 696 from which the windfarms 695 connected to the network the system. In this example, the coordinated system controller 605 may include a proportional-integral (P+I) regulator algorithm (filter) 630 and then a distribution algorithm (Network Solutions) 640 whose technical effect is to supply command signals to one or more windfarms and/or passive devices such as the shunt capacitors 670 and on-load tap changers 675. The limitations 645 may include reactive power and voltage for the various windfarms and nodes of the transmission grid may be considered in the processing of the algorithm. The command signals to the windfarms may include reactive power reference (Qref (WP)) 680 or voltage reference (Vref(WP) 685).

Figure 7:
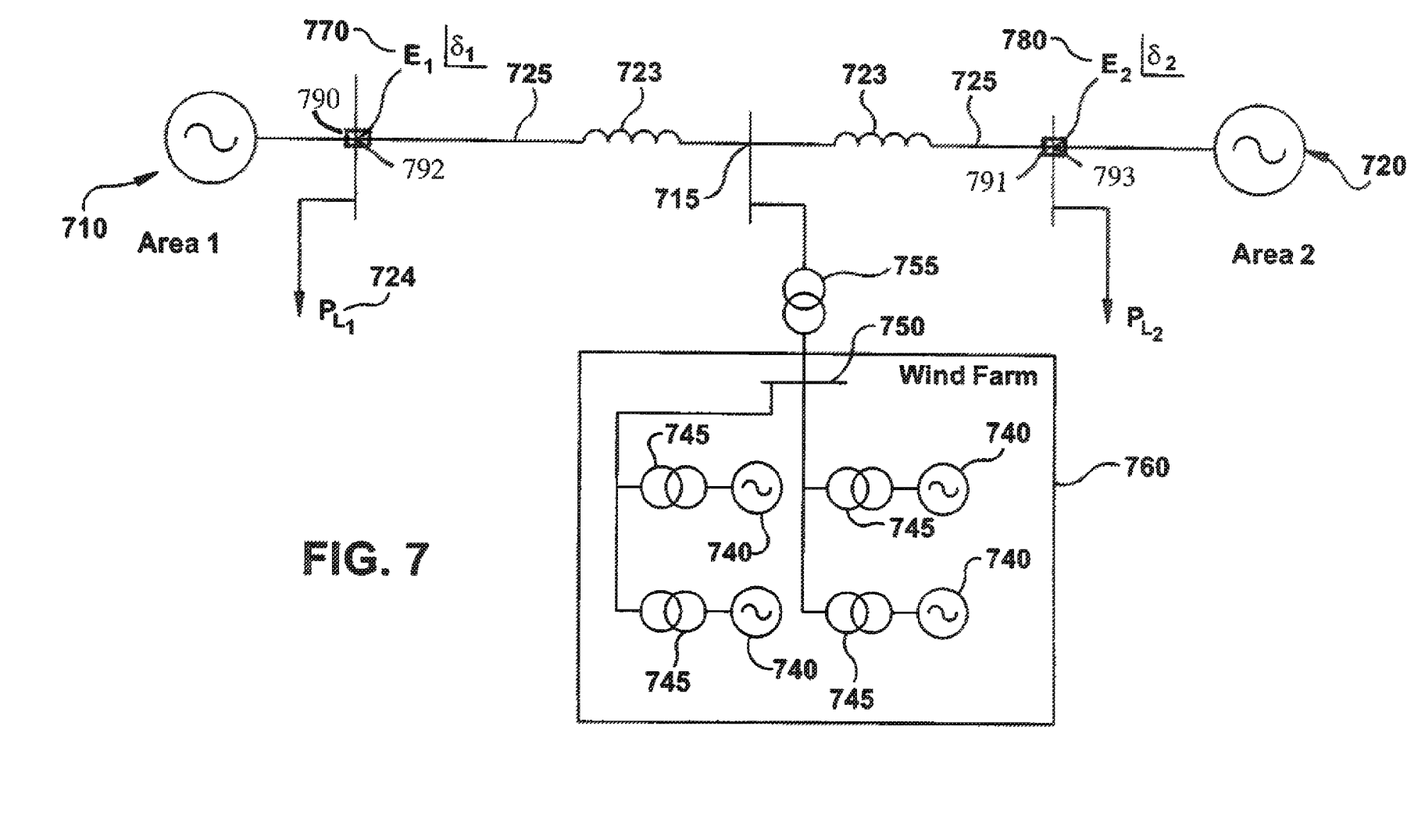
FIG. 7 illustrates a schematic representation for a prior art transmission network including two areas with both power generation capability and load supply capability connected to a windfarm.

FIG. 7 illustrates a schematic representation for a transmission network including two areas with both power generation capability and load supply capability connected to a windfarm. Generator transmission/load area 1 710 and area 2 720 are connected by transmission lines 725 which include reactance 723. A plurality of wind turbine generators 740 are connected through connection transformers 745 to collection bus 750. Collection bus is tied to a point of common connection 715 through main transformer 755. Generator transmission/load area 1 710 and generator transmission/load area 2 720 supply local area loads PL1 724 and PL2 725, respectively. Generator transmission/load area 1 710 and generator transmission/load area 2 720 provide output voltages of E1 at reference angle δ1 and output voltage of E2 at reference angle δ2, respectively. Instrument sensor 790 at measurement point 792 on remote generator/load transmission area 710 provides output voltage E1 and reference angle δ1. Instrument sensor 791 at measurement point 793 on remote generator/load transmission area provides output voltage E2 at reference angle δ2.

Figure 8:
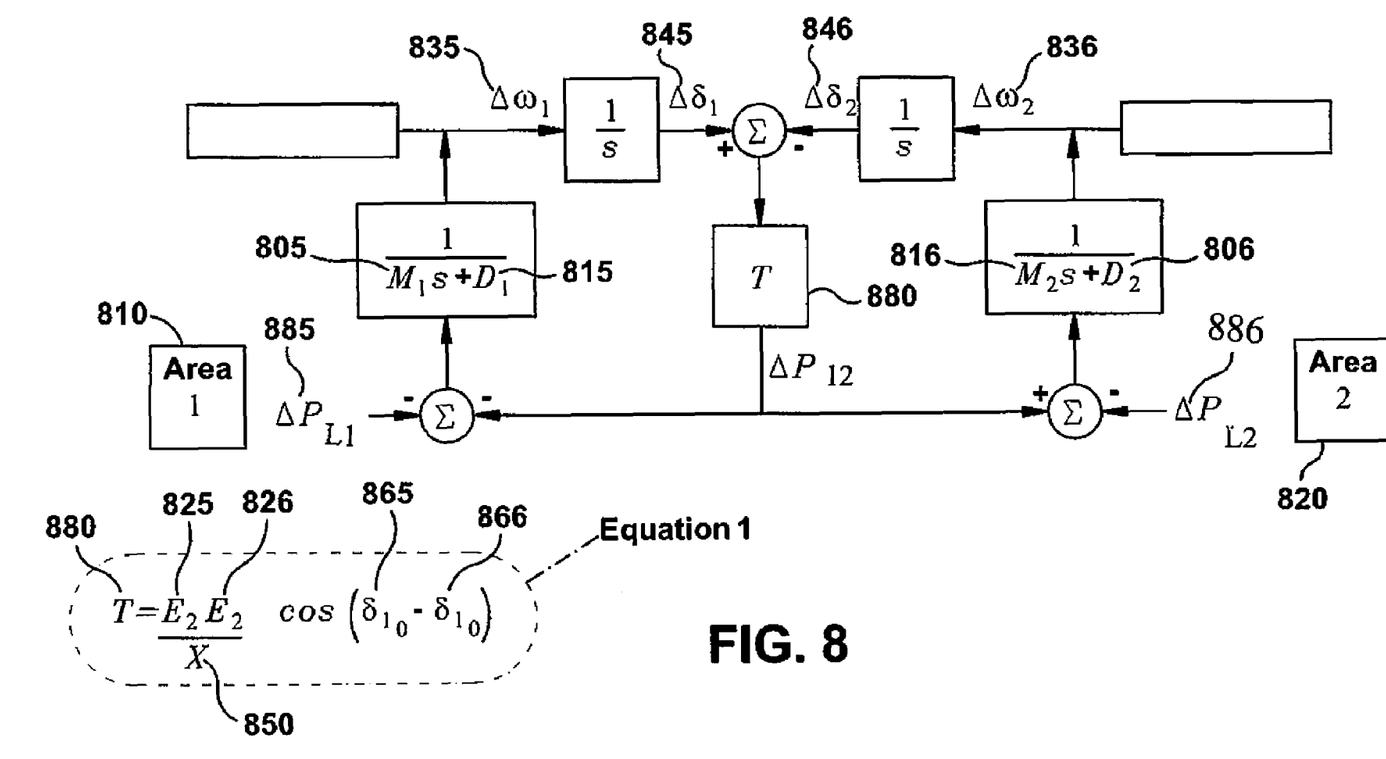
FIG. 8 illustrates a Laplace block-diagram representation of networks for small signal analysis of electromechanical oscillation.

FIG. 8 illustrates a Laplace block-diagram representation of the network of FIG. 7 for small signal analysis of electromechanical oscillation. M1 and M2 represent the equivalent inertia of area 1 and area 2, respectively. D1 and D2 represent load-damping constants of area 1 and area 2, respectively. E1 and E2 represent the voltage magnitudes for area 1 and area 2, respectively. δ1 and δ2 represent the voltage angle with respect to the same reference for area 1 and area 2, respectively. PL1 and PL2 represent load power consumption in area 1 and area 2, respectively. ω1 and ω2 represent frequency of area 1 and area 2, respectively. X represents the effective total reactance between area 1 and area 2. δ1o and δ2o represent the initial voltage angle with respect to the same reference. Io represents the initial magnitude of current between area 1 and area 2. T is the synchronizing torque coefficient determined according to:

$$T=(E1*E2/X)*\cos(\delta 1o-\delta 2o) \quad \text{Equation 1.}$$

According to the value of T, a differential power flow is driven between area 1 and area 2. The differential power flow between area 1 and area 2 must be strong enough to maintain the two areas in synchronism. Depending on the damping characteristic of the system, the differential power flow may be damped out, may oscillate, or may grow to a point where system trips occur.

Figure 9A:
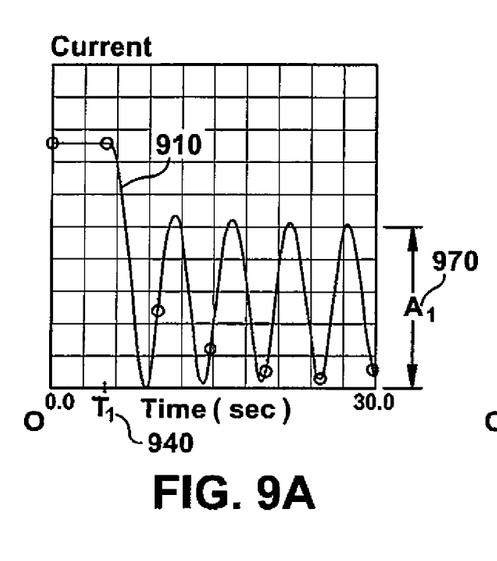
FIGS. 9A-9C illustrates a time simulation of a load switching event of the transmission network of FIG. 7 without a stabilizing loop.
Figure 9B:
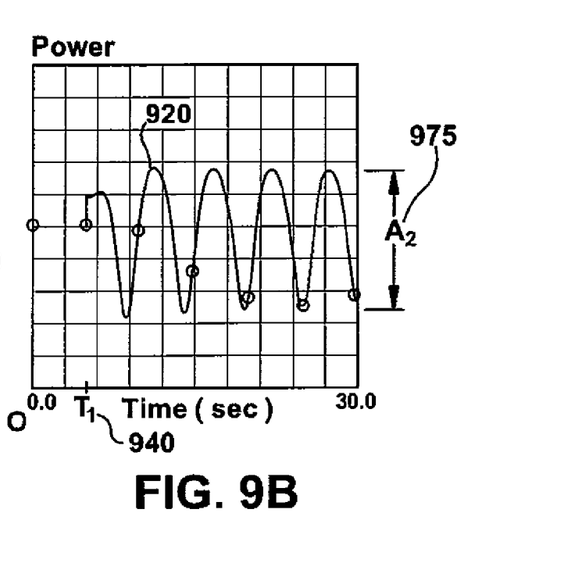
Figure 9C:
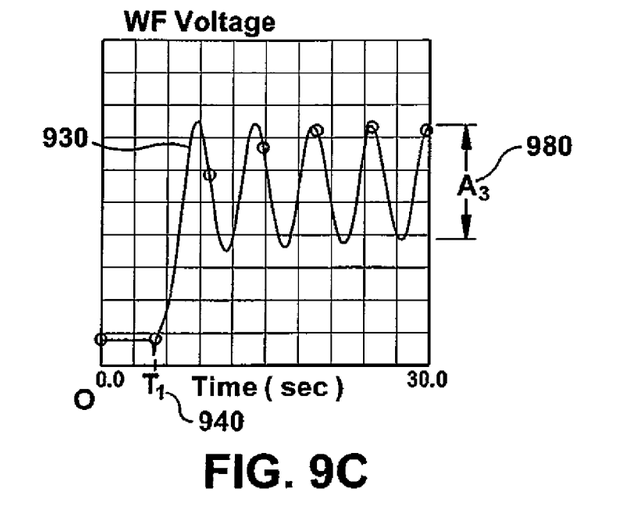

FIGS. 9A-9C illustrates a time simulation of a load switching event of the transmission network of FIG. 7 without a stabilizing loop. FIG. 9A illustrates a transient response for current 910 flowing between areas. FIG. 9B illustrates a transient response for power 920 flowing between areas. FIG. 9C illustrates a response for voltage 930 at the point of connection (POC) between the windfarm and the grid (FIG. 7). The transient is initiated by a load shift at T1 940 initiating an oscillation of resonant mode for the current 910, power 920 and voltage 930. Peak amplitudes $A_1$ 970, $A_2$ 975 and $A_3$ 980 of the oscillations for current, power and voltage are shown.

Figure 10:
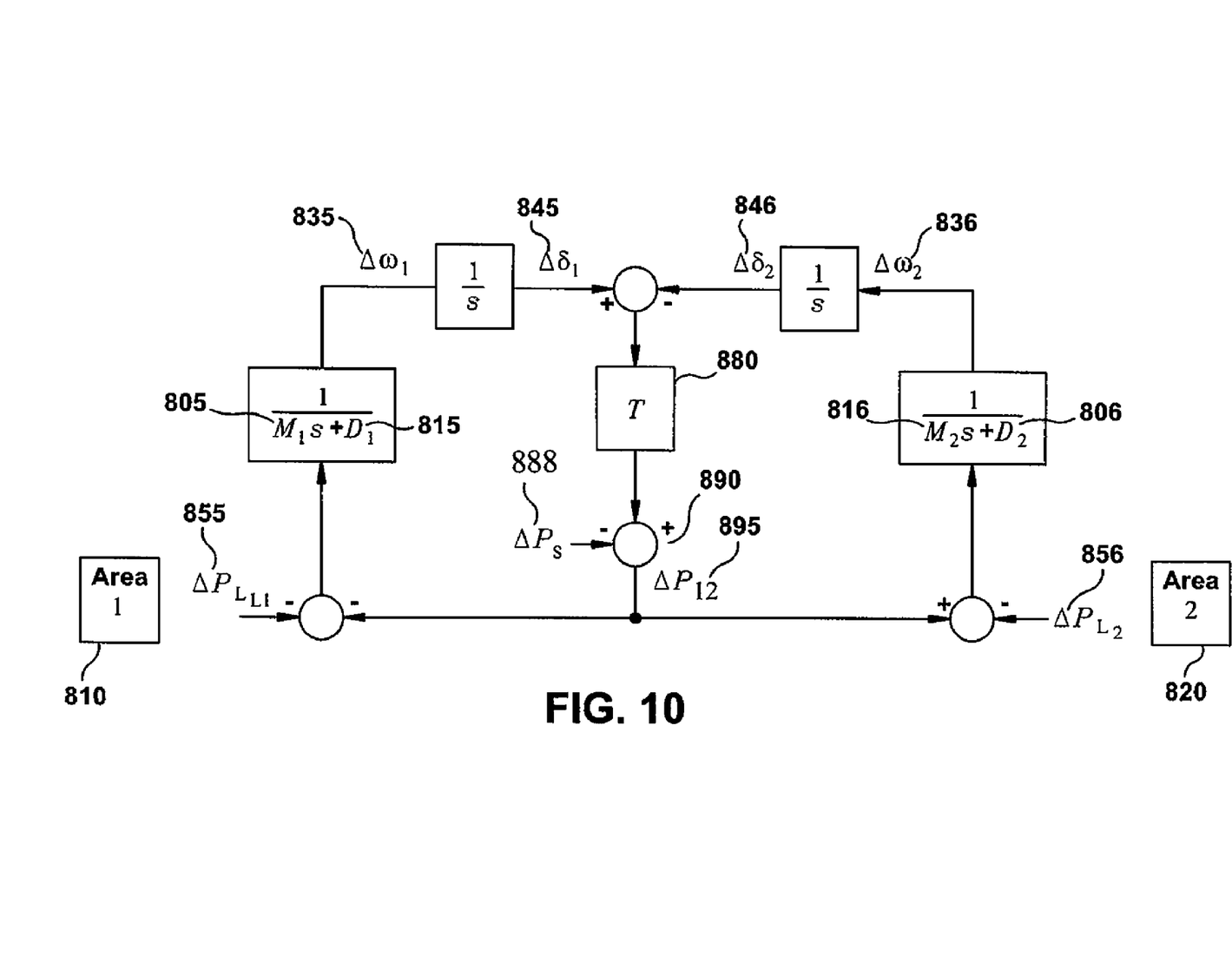
FIG. 10 illustrates a Laplace block-diagram representation of networks for small signal analysis of electromechanical oscillation, including a stabilizing loop.

FIG. 10 illustrates a Laplace block-diagram representation of networks for small signal analysis of electromechanical oscillation, including a stabilizing loop. The Laplace small signal model of FIG. 8 may be modified by incorporating a synchronizing power flow $\Delta P_s$ 888 added to the output of torque generating block T 880 at summer 890 to produce a modified differential power flow $\Delta P_{12}$ 895. The new synchronizing power flow $\Delta P_s$ 888 may be generated with the inventive windfarm controller.

Figure 11:
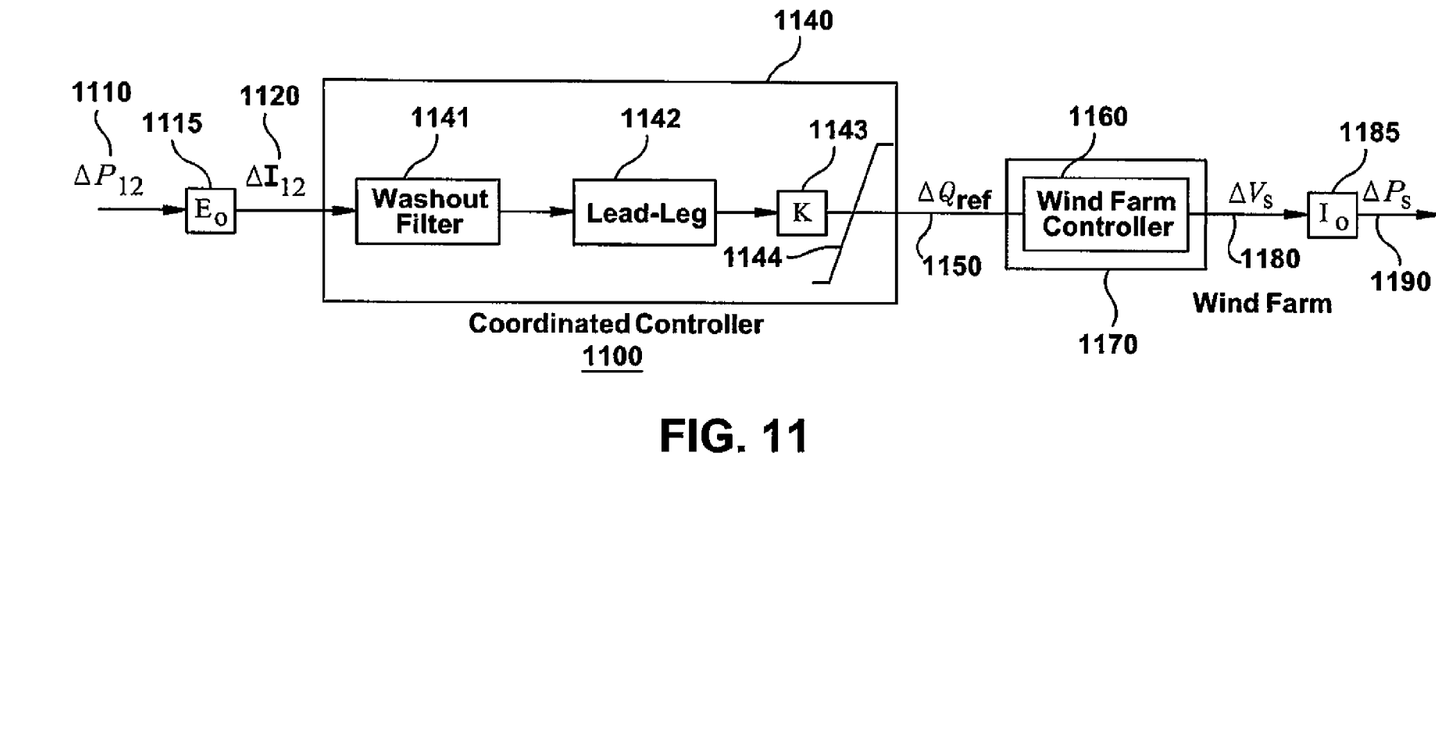
FIG. 11 illustrates an embodiment of an inventive windfarm controller incorporating a stabilizing loop for improved damping of network electromechanical oscillation.

FIG. 11 illustrates an embodiment of an inventive windfarm coordinated controller incorporating a stabilizing loop for improved damping of network electromechanical oscillation. System parameters ($I_1$, $V_1$, $\delta_1$ and $P_1$) and ($I_2$, $V_2$, $\delta_2$ and $P_2$) may be measured by a wide area measurement system as in FIG. 2 and FIG. 3. $\Delta I_{12}$ 1120 (current flow from area 1 to area 2) may be inferred from differential power flow $\Delta P_{12}$ 1110 and Eo 115. $\Delta I_{12}$ 1120 may be applied to coordinated windfarm controller 1140 including washout filter 1141, lead-lag filter 1142, gain factor 1143, and system limiter 1144 to provide a $\Delta Q_{ref}$ 1150 to be transmitted to the local windfarm controller 1160 for windfarm 1170 within the transmission system to stabilize oscillations. In response to the $\Delta Q_{ref}$ 1150, the windfarm 1170 may generate a differential voltage output ΔV, resulting in a differential current output ΔIo 1185, providing a differential power output to the transmission network $\Delta P_s$ 1190.

Figure 12A:
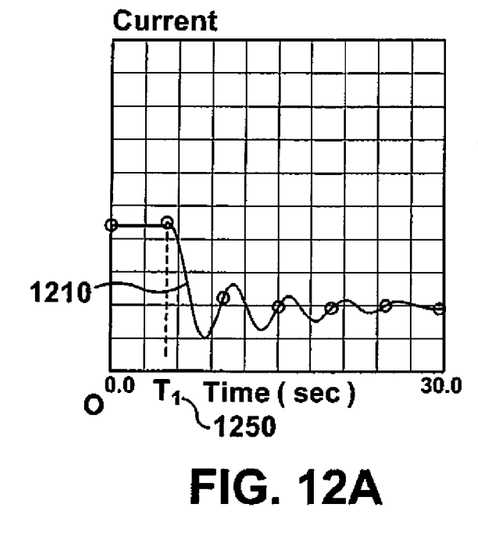
FIGS. 12A-12D illustrates a time simulation of a load switching event of the transmission network of FIG. 7 incorporating an embodiment of the inventive stabilizing loop.
Figure 12B:
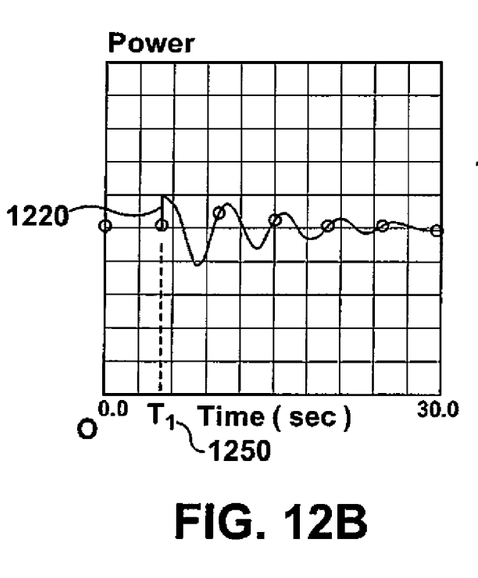
Figure 12C:
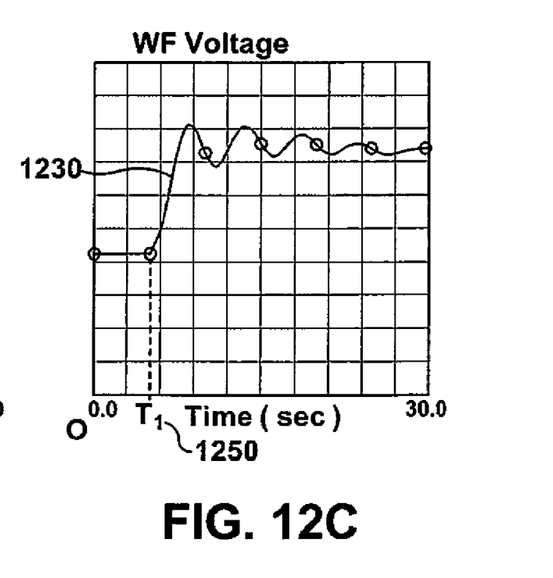
Figure 12D:
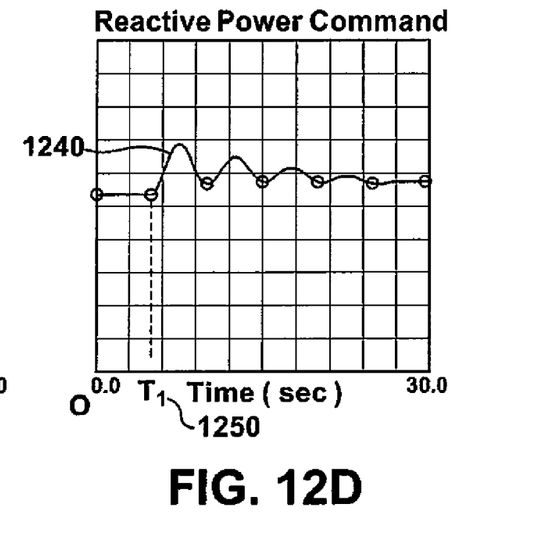

FIGS. 12A-12D illustrates a time simulation of a load switching event of the transmission network of FIG. 7 incorporating an embodiment of the inventive stabilizing loop. FIG. 12A illustrates a transient response for current 1210 flowing between areas. FIG. 12B illustrates a transient response for power 1220 flowing between areas. FIG. 12C illustrates a response for voltage 1230 at the point of connection (POC) between the windfarm and the grid (FIG. 7). FIG. 12D illustrates a reactive power command 1250 incorporating the stabilizing loop of FIG. 11. The transient is initiated by a load shift at T1 1250 initiating a damped oscillatory response for the current 1210, power 1220 and voltage 1230. Peak amplitudes of the transient response 1270, 1275 and 1280 for current, power and voltage are significantly reduced over the peak amplitudes for oscillations 970, 975 and 980 of the unstabilized system of FIG. 9A-9C.

The usefulness of windfarm power controls can be further exploited by making use of wide-area measurements and high bandwidth communication networks. Considering a single instance of a windfarm, the capability to provide reactive power at the point of interconnection using the power electronic converter of each turbine, can improve damping and voltage performance. An additional term to these controllers incorporating wide-area measurements is used to improve system stability. A set of windfarms with a coordinated set of controller settings, with each windfarm supplied by a small number of possibly different wide-area measurements could further improve the overall system performance. An alternative approach includes a centralized controller with access to network-wide measurements and high bandwidth controller to windfarm communications for actuation signals.

While various embodiments are described herein, it will be appreciated from the specification that various combinations of elements, variations or improvements therein may be made, and are within the scope of the invention.

The invention claimed is:

1. A wind turbine generator control system, for a plurality of windfarms each including at least two wind turbine generator connected through a collection bus and main transformer to a point of common connection with a transmission network including a plurality of generator/load groups physically distributed within the transmission network and including at least one non-renewable energy source, comprising:

a windfarm controller for each of the plurality of windfarms, wherein the windfarm controller controls operation of the at least one wind turbine generator within the windfarm;

at least one measurement point on a transmission network, the at least one measurement point being remote from the point of common connection for each of the plurality of windfarms, for measuring operating parameters of the transmission network;

a plurality of sensors on the at least one measurement point on the transmission network, remote from the point of common connection for each of the plurality of windfarms, for measurement of transmission network operating parameters related to control of each of the plurality of windfarms;

a coordinated windfarm controller employing at least one of the measured transmission network operating parameters related to control of the at least one windfarm generating output signals for stability of the transmission network at a location remote from the point of common connection of each of the plurality of windfarms with the transmission network; and communication means for transmitting the transmission network operating parameters for a location remote from the point of common connection for each of the plurality of windfarms to the coordinated windfarm controller and transmitting the output signals to at least one of the plurality of windfarms.

2. The wind turbine generator control system according to claim 1, wherein the windfarm controller for each of the plurality of windfarms controls at least one of terminal voltage of the wind turbine generator; voltage output for the windfarm, reactive power output for the wind turbine generator, and reactive power output for the windfarm.

3. The wind turbine generator control system according to claim 1, wherein output signals from the coordinated windfarm controller for stability of the transmission network comprise: a signal mitigating voltage collapse on the transmission network.

4. The wind turbine generator control system according to claim 1, wherein output signals from the coordinated windfarm controller for stability of the transmission network comprise: a signal providing damping control for electromechanical oscillations occurring on the transmission network.

5. The wind turbine generator control system according to claim 1, wherein the output signal from the coordinated windfarm controller further comprises: a windfarm reactive power reference signal for each of the at least one windfarms.

6. The wind turbine generator control system according to claim 1, wherein the output signal from the coordinated windfarm controller comprises: a windfarm voltage reference signal for each of the plurality of windfarms.

7. The wind turbine generator control system according to claim 1, wherein the output signal from the coordinated windfarm controller further comprises: at least one of a windfarm active power reference signal and a windfarm reactive power reference signal for each of the plurality of windfarms.

8. The wind turbine generator control system according to claim 1, further comprising network limitations provided to the coordinated windfarm controller, including constraints on at least one of reactive power and voltage for the at least one windfarm.

9. The wind turbine generator control system according to claim 1, further comprising network limitations provided to the coordinated windfarm controller, including constraints en on at least one of reactive power and voltage for locations of the transmission network remote from the point of common connection with the at least one windfarm.

10. The wind turbine generator control system according to claim 1, further comprising:

an on-line tap changer for the main transformer, including remote control capability; passive shunt compensators, including remote control capability; and an output signal from the coordinated windfarm controller to at least one of the on-line tap changer and the passive shunt compensators for mitigating voltage collapse.

11. The wind turbine generator control system according to claim 1, further comprising:

an on-line tap changer for the main transformer, including remote control capability;

passive shunt compensators, including remote control capability;

an output signal from the coordinated windfarm controller to at least one of the on-line tap changers and the passive shunt compensators for damping electromechanical oscillations on the transmission grid.

12. The wind turbine control system according to claim 1, wherein the operating parameters being measured by the sensors include at least one of real power, reactive power, current, and phase angle at the at least one measurement point on at least one of a plurality of generator/load groups for transmission network.

13. The wind turbine control system according to claim 12, wherein the parameters being measured by the sensors include voltage magnitude and voltage reference angle delta at the at least one measurement point on at least one of the plurality of generator/load groups for transmission network.

14. The wind turbine control system according to claim 13, wherein the communication means for transmitting transmission network parameters being measured by the sensors to the coordinated windfarm controller include synchronized phasors.

15. The wind turbine control system according to claim 1 wherein the coordinated windfarm controller comprises:

a washout filter;

a lead-lag compensator;

a gain factor; and a clamped output limiter, which together act in serial operation on the operating parameters measured on the transmission network remote from point of common connection and transmitted by a communications system to the coordinated windfarm controller.

16. The wind turbine control system according to claim 1 wherein the coordinated windfarm controller further comprises:

an adjustable reference voltage input;

a measured voltage parameter on at least one measurement location on the transmission network remote from the point of common connection of the windfarms with the transmission network;

a comparator comparing the adjustable reference voltage and the measured voltage parameter;

a proportional integral filter acting on an output from the comparator;

an input for real power and reactive power limits for at least one of the windfarms and measurement point on the network;

a distribution algorithm acting on the output from the proportional integral filter according to the input for real power and reactive power limits and commanding an output for one of a reactive power output and a voltage reference output to at least one of a plurality of local windfarm controllers.

17. The wind turbine generator control system to claim 15, wherein the coordinated windfarm controller is located on a computer system of a utility providing the transmission network.

18. The utility transmission grid according to claim 15, wherein the coordinated windfarm controller is located on a computer system of a windfarm management system for the windfarm.

19. The utility transmission grid according to claim 15, wherein the coordinated windfarm controller is located on a computer system independent of both the utility and the windfarm.

20. A method for maintaining stability on a transmission network that includes a plurality of generator/load groups with at least one non-renewable energy source physically distributed within the transmission network and plurality of windfarms each with a windfarm controller and at least two wind turbine generator connected through a collection bus and main transformer to a point of common connection with the transmission network, comprising:
 measuring at least one transmission network operating parameter from at least one point on the transmission network remote from the point of common connection of each of the plurality of windfarms with the transmission network;
 transmitting the at least one transmission network operating parameter, from the at least one point on the transmission network remote from the point of common connection of each of the plurality of windfarms to a coordinated windfarm controller;
 determining by the coordinated windfarm controller in response to least one of the measured transmission network parameters an operating command for at least one windfarm relating to stability of the transmission network at a location remote to the point of common connection of each of the plurality of windfarms with the transmission network;
 transmitting the operating command for at least one windfarm for stability of the transmission system, at a location remote from the point of common connection of each of the plurality of windfarms with the transmission network, from the coordinated windfarm controller to the at least one windfarm; and
 providing a commanded output by the at least one of the plurality of windfarms to the transmission network at the point of common connection for maintaining stability for the at least one point on the transmission network remote from the point of common connection.

21. The method for maintaining stability on a transmission network according to claim 20, the step of determining an operating command for at least one windfarm relating to stability of the transmission network further comprising: determining an operating command mitigating voltage collapse on the transmission network.

22. The method for maintaining stability on a transmission network according to claim 20, the step of determining an operating command for at least one windfarm relating to stability of the transmission network further comprising: determining an operating command providing damping control on the transmission network.

23. The method for maintaining stability on a transmission network according to claim 20, the step of determining an operating command for at least one windfarm relating to stability of the transmission network further comprising: determining a windfarm reactive power reference signal for the at least one windfarm controller wherein the signal enhances transmission network stability.

24. The method for maintaining stability on a transmission network according to claim 20, the step of determining an operating command for at least one windfarm relating to stability of the transmission network further comprising: determining a windfarm voltage reference signal for the at least one windfarm controller wherein the signal enhances transmission network stability.

25. The method for maintaining stability on a transmission network according to claim 20, the step of determining an operating command for at least one windfarm relating to stability of the transmission network further comprising: determining a windfarm real power reference signal for the at least one windfarm controller wherein the signal enhances transmission network stability.

26. The method for maintaining stability on a transmission network according to claim 20, the step of determining an operating command for at least one windfarm relating to stability of the transmission network, wherein the at least one windfarm includes an on-load tap changer for the main transformer, comprises: determining setting of the on-load tap changer to enhance transmission network stability.

27. The method for maintaining stability on a transmission network according to claim 20, the step of determining an operating command for at least one windfarm relating to stability of the transmission network, wherein the at least one windfarm includes shunt compensation, comprises: determining shunt compensation settings to enhance transmission network stability.

28. The method for maintaining stability on a transmission network according to claim 20, the step of measuring at least one transmission network operating parameter at least one point on the transmission network further comprising: measuring parameters including at least one of real power, reactive power, current, and phase angle at the at least one measurement point on the power generation/load group for transmission network.

29. The method for maintaining stability on a transmission network according to claim 20, the step of measuring at least one transmission network operating parameter at least one point on the transmission network further comprising: measuring parameters including voltage magnitude and voltage reference angle delta at the at least one measurement point on the power generation/load group for transmission network.

30. The method for maintaining stability on a transmission network according to claim 29, wherein the parameters being measured by the sensors are supplied to the coordinated windfarm controller as synchronized phasors.

* * * * *

UNITED STATES PATENT AND TRADEMARK OFFICE
CERTIFICATE OF CORRECTION

PATENT NO. : 8,058,753 B2
APPLICATION NO. : 12/262951
DATED : November 15, 2011
INVENTOR(S) : Achilles et al.

It is certified that error appears in the above-identified patent and that said Letters Patent is hereby corrected as shown below:

In the Claims:

Column 10, lines 66-67, "generator" should read --generators--;
Column 12, line 3, at the end of the line please delete "en";
Column 13, line 22, "generator" should read --generators--.

Signed and Sealed this
Twenty-seventh Day of August, 2013

Teresa Stanek Rea
*Acting Director of the United States Patent and Trademark Office*